US005634437A

United States Patent [19]

Petersen

[11] Patent Number: 5,634,437

[45] Date of Patent: Jun. 3, 1997

[54] TIE-ME-FLEX RATITE LEG BRACE

[76] Inventor: Lee Roy H. Petersen, RT 2 Box 604, Plantersville, Tex. 77363

[21] Appl. No.: 514,531

[22] Filed: Aug. 14, 1995

[51] Int. Cl.[6] ........................ A01K 37/00

[52] U.S. Cl. ........................ 119/714; 119/817

[58] Field of Search ........................ 119/713, 714, 119/722, 724, 817, 818, 819, 816; 54/71

[56] References Cited

U.S. PATENT DOCUMENTS

| | | | |
|---|---|---|---|
| 369,548 | 9/1887 | Parrish | 119/818 |
| 373,173 | 11/1887 | Burris | 54/71 |
| 408,436 | 8/1889 | Reid | 54/71 |
| 510,337 | 12/1893 | Glascock | 54/71 |
| 766,425 | 8/1904 | Coleman | 119/817 |
| 1,240,111 | 9/1917 | Willson | 119/714 |
| 1,346,954 | 7/1920 | Griffey | 119/713 |
| 1,787,531 | 1/1931 | Jordan | 119/713 |
| 3,994,264 | 11/1976 | Flynt | 119/818 X |
| 4,424,764 | 1/1984 | Carlin | 119/817 X |
| 5,402,753 | 4/1995 | Barnes | 119/714 |

*Primary Examiner*—Robert P. Swiatek
*Assistant Examiner*—Elizabeth Shaw

[57] ABSTRACT

An orthopedic leg brace to correct "cow hock" and "splayed" leg conditions of large birds such as ratites. The brace comprises a spring steel band which arches over the bird's back and fastens to leather cuffs above the hock of each leg. For a "splayed" leg condition another piece of spring steel is hinged to each end of the steel band and the other end is fastened to another set of leather cuffs just above each foot to pull the feet back into normal position.

2 Claims, 2 Drawing Sheets

TIE-ME-FLEX RATITE LEG BRACE

BACKGROUND OF THE INVENTION

The field of this invention is directed to animal orthopedic devices, and in particular a leg brace to correct "hocked" and "splayed" leg conditions primarily in ratites.

Ratites are large avian bipeds which includes ostriches, emus, rheas. Often ratites raised in captivity develop leg problems which will eventually cause the bird to become incapacitated. Veterinary surgery to correct these conditions is far too costly and also not too successful.

The purpose of this invention is to provide an economical and highly effective orthopedic leg device to correct leg problems in ratites.

It is the object of the invention to correct "hock" and "splayed" leg conditions common in ratites raised in captivity.

SUMMARY OF THE INVENTION

It is the object of this invention to provide a ratite leg brace to correct "cow hock" and "splayed" leg conditions common to ratites.

To correct "cow hock" conditions in ratites this invention applies outward pressure on the leg above the hock joint using a pivotal rotation above the bird's back to twist the foot inwards as the bird steps forward or runs.

To correct "splayed" conditions with this invention less pressure is applied to the hock joints, and inward pressure is applied at the foot to pull the turned out foot toward its normal position.

For leg braces with multiple steel bands over the back an optional breast strap is applied to stabilize the arch of the brace above the bird's back.

DESCRIPTION OF THE PREFERRED EMBODIMENTS

Referring to FIGS. 1, 2, 3 and 4 the "hock" leg brace of the present invention comprises a basic spring steel band(s) C2 which is covered or enclosed by a plastic or rubber hose material C3. A leather cuff C1 is fastened to the spring steel band C2 with fasteners C6 at the hock position of the affected ratite.

Figure 1:
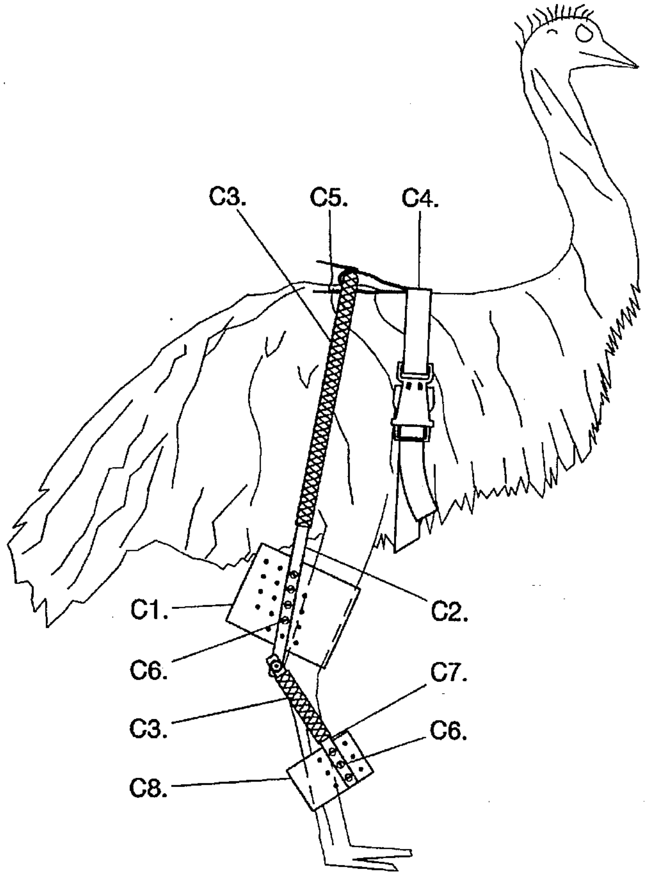
FIG. 1 is a side view showing the application of a "splayed" leg brace along with an optional breast strap.
Figure 2:
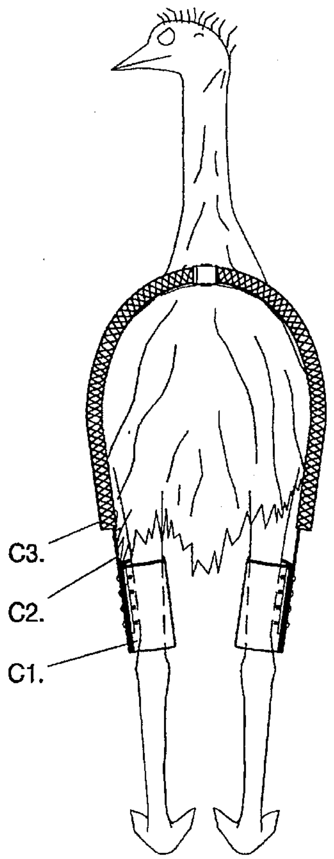
FIG. 2 is a posterior view showing the application of a "hock" leg brace.
Figure 4:
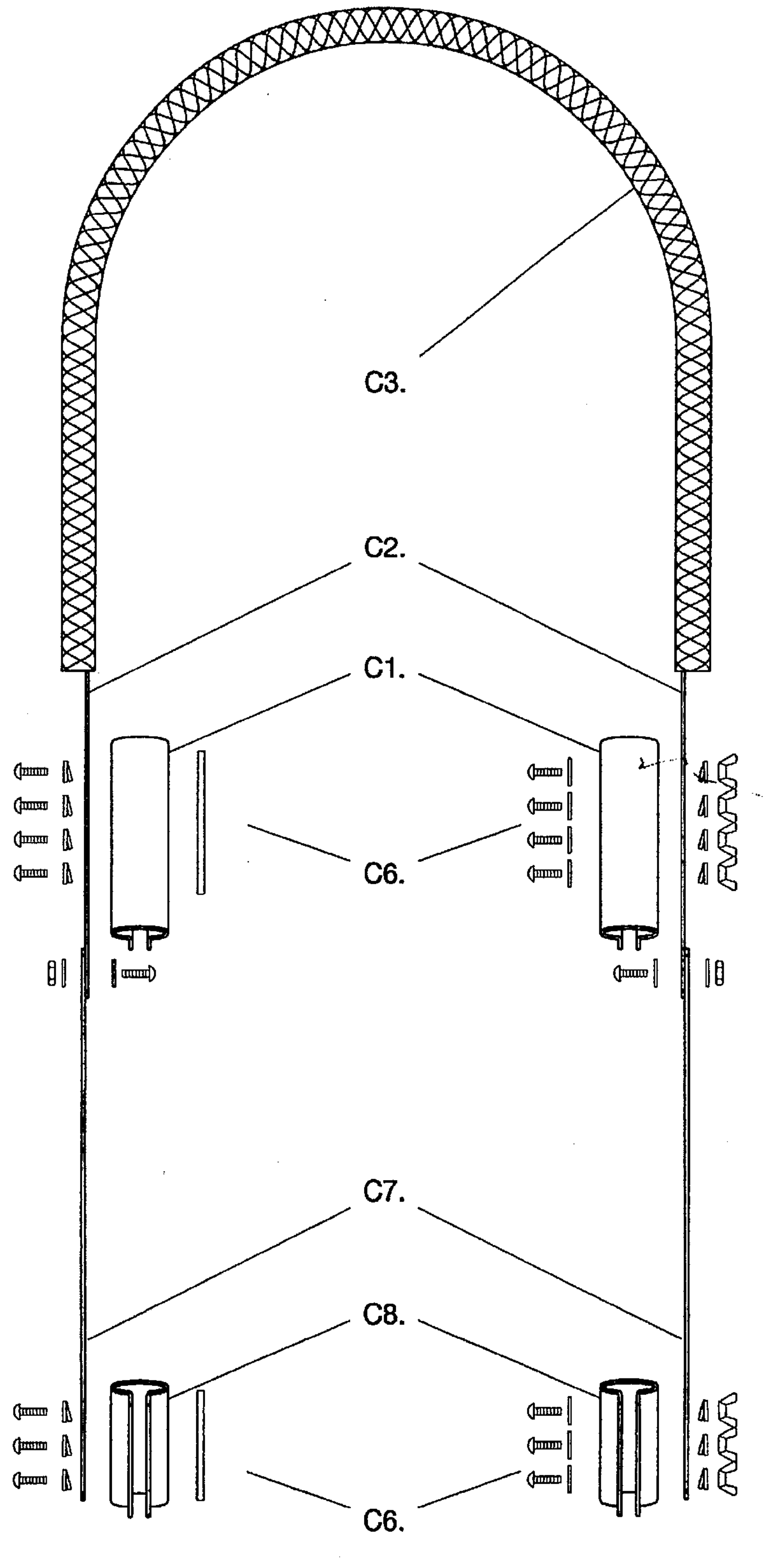
FIG. 4 is a front elevational view of the "splayed" leg brace. The "hock" leg brace is the same as this figure except components C7 and below are excluded.

Referring to FIGS. 1 and 4 the "splayed" leg brace of this invention comprises the same embodiments described above plus an extension of the brace with additional pieces of spring steel C7 which is hinged onto the basic spring steel band C2 and which is fastened with another set of leather cuffs C8 with fasteners C6 just above each foot of the bird.

Figure 3:
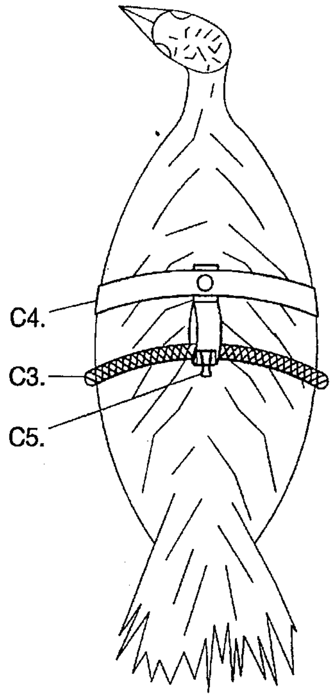
FIG. 3 is a top elevational view showing the application of a "hock" or "splayed" leg brace along with an optional breast strap.

Referring to FIGS. 1 and 3 an optional breast strap C4 is applied to stabilize the basic spring steel band C2 within C3 over the back of the bird with a clip C5. The breast strap C4 is recommended on large, heavy braces.

After the brace has been installed on the bird, as illustrated, the brace will apply constant pressure on the legs or feet to gradually rotate the legs and feet to their normal position, yet allows the bird freedom to bed down, walk, run, etc.

I claim:

1. A ratite leg brace for correcting "cow hock" leg conditions comprising:

a spring steel band that can arch over the back of said ratite a pair of leather cuffs able to be wrapped around the bird's legs above the hock joints a set of fasteners consisting of screws, washers, nuts or thread bars which fastens the said leather cuffs to the said spring steel band a breast strap fastened only at the center of said spring steel band for stabilizing said spring steel band.

2. The ratite leg brace of claim 1 including the means for correcting "splayed" leg conditions comprising extending said brace with a hinge at the hock joint to accommodate an extra piece of steel down each leg to the feet and another set of leather cuffs and fasteners for attachment just above the bird's feet.

* * * * *